US 6,567,809 B2

(12) United States Patent
Santosuosso

(10) Patent No.: US 6,567,809 B2
(45) Date of Patent: May 20, 2003

(54) DISABLING AND RELOADING ENTERPRISE JAVA BEANS USING DATABASE TRIGGER PROGRAMS

(75) Inventor: John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 09/877,304

(22) Filed: Jun. 8, 2001

(65) Prior Publication Data

US 2002/0188591 A1 Dec. 12, 2002

(51) Int. Cl.[7] ............................................. G06F 17/30
(52) U.S. Cl. ......................... 707/10; 709/246; 717/107
(58) Field of Search ............................... 707/1, 10, 2, 3, 707/4, 5, 6, 7, 8; 709/246, 203; 717/107

(56) References Cited

U.S. PATENT DOCUMENTS 6,237,135 B1 * 5/2001 Timbol ........................ 717/107
6,256,676 B1 * 7/2001 Taylor et al. ................ 709/246
6,385,643 B1 * 5/2002 Jacobs et al. ................ 709/203
6,411,956 B1 * 6/2002 Ng .............................. 707/10

* cited by examiner

Primary Examiner—Diane D. Mizrahi
Assistant Examiner—Yicun Wu
(74) Attorney, Agent, or Firm—Moser, Patterson & Sheridan, LLP; Gero G. McClellan

(57) ABSTRACT

Methods and systems for maintaining coherency of data such as between data contained in executable code and a source location of the data (e.g., a table of a database). In a particular embodiment, an enterprise Java Bean (EJB) is hydrated with data retrieved from a database data structure having a trigger defined thereon. The trigger is fired in response to modifying the data structure. In response to firing the trigger, it is determined whether an invalidation criterion for the EJB has been satisfied. If so, the EJB is invalidated.

32 Claims, 5 Drawing Sheets

DISABLING AND RELOADING ENTERPRISE JAVA BEANS USING DATABASE TRIGGER PROGRAMS

BACKGROUND OF THE INVENTION

1. Field of the Invention

Embodiments of the present invention generally relate to data processing. In particular, methods, systems and article of manufacture are provided for ensuring coherency of data in databases.

2. Description of the Related Art

In data processing systems, it is desirable to economize storage accesses to improve the overall system performance. To this end, many applications manage data by buffering data (e.g., rows of a table) into memory. In this way accesses to a data resource manager (e.g., a database) can be reduced by accessing the buffered data rather the underlying table itself, which is a more time consuming operation. However, this approach is limited to cases in which the application buffering the data is the only application changing the data. This is so because if other applications are allowed to change the underlying table itself, the table and the buffered data will not be synchronized. As such, the application accessing the buffered data will retrieve data which does not reflect changes made to the table by other applications.

In some cases, modifications to the underlying table do not occur so that the underlying data and the buffered data are always synchronized. Alternatively, data modifications are not considered relevant to an application or user. For example, the modification may happen so infrequently so as to be irrelevant (e.g., no longer needed) when the data ultimately does change. As another example, the modified data may not be particularly relevant (e.g., a date in a Web page). In any such cases, it is desirable to avoid unnecessarily accessing the underlying table. To this end, a user may use Enterprise JavaBeans to advantage.

In a computer network using the client/server model, Enterprise JavaBeans (EJB) is an architecture for setting up program components that run on the server side of the computer network. EJB is built on the JavaBeans technology for distributing program components (which are called Beans) to clients in a network. In Enterprise JavaBeans, there are two types of beans: session beans and entity beans. An entity bean is described as one that, unlike a session bean, has persistence and can retain its original behavior or state.

EJB program components are written in the Java programming language. To deploy an EJB or component, it must be part of a specific application, called a "container". The application or container that runs the EJB is sometimes called an application server. A common use of EJBs is to provide an interface between users and an application and its database.

To improve processing efficiency and reduce accesses to a database, EJBs can be given a property called "Exclusive". When enabled, the exclusive property causes an EJB server to cache a bean so that, after a row has been stored to the bean (referred to as the "hydration" of the bean), access back to a database need not be made. However, this approach does not ensure that the data in the database will not be changed during the time the cached bean is being used. Accordingly, coherency of the data may still be compromised.

Therefore, there is a need for a method and system adapted to ensure the validity of data contained in cache or other working storage.

SUMMARY OF THE INVENTION

Embodiments of the present invention generally provide methods and systems for maintaining coherency of data. In particular, coherency is maintained between data contained in executable code and a source location of the data (e.g., a table of a database).

One embodiment provides a method comprising retrieving data from a data structure having a trigger defined thereon and placing the data with executable code configured to utilize the data and configured with a property indicating that the data will be accessed during execution instead of the data structure. The data structure is then modified. In response to modifying the data structure, the trigger is fired. In response to firing the trigger, the executable code is invalidated. In one embodiment, the data and the executable code are contained in working storage which may be, for example, volatile memory or storage.

Another embodiment provides a method, comprising hydrating an enterprise Java Bean (EJB) with data retrieved from a database data structure having a trigger defined thereon. The trigger is fired in response to modifying the database data structure. In response to firing the trigger, it is determined whether an invalidation criterion for the EJB has been satisfied. If so, the method comprises invalidating the EJB.

Yet another embodiment provides a computer-readable medium containing a program which, when executed by a processor, performs steps comprising processing a signal indicating that a trigger defined on a database data structure has fired in response to modifying the database data structure and determining whether an invalidation criterion for an enterprise Java Bean (EJB) associated with data retrieved from the database data structure has been satisfied. The invalidation criterion is satisfied according to a manner in which the data structure is modified. If the invalidation criterion is satisfied, the EJB is invalidated.

Still another embodiment provides a system, comprising a database containing at least one table having a trigger defined thereon, a memory area configured to temporarily store at least one EJB and an enterprise Java Bean (EJB) server configured to communicate with the database. The EJB is hydrated with data from the at least one table and configured with an exclusive property and an invalidation property that causes the EJB to be invalidated in response to the trigger firing when invalidation criterion is satisfied.

Still another embodiment provides a data structure contained in a memory, comprising a table identifier for a table contained in a database and having a trigger defined thereon, wherein the trigger is configured to fire upon modifying the table; a code identifier for an enterprise Java Bean (EJB) contained in a cache memory and hydrated with data from the table; and an invalidation criterion which, when satisfied as result of modifying the table, causes the EJB to be invalidated.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
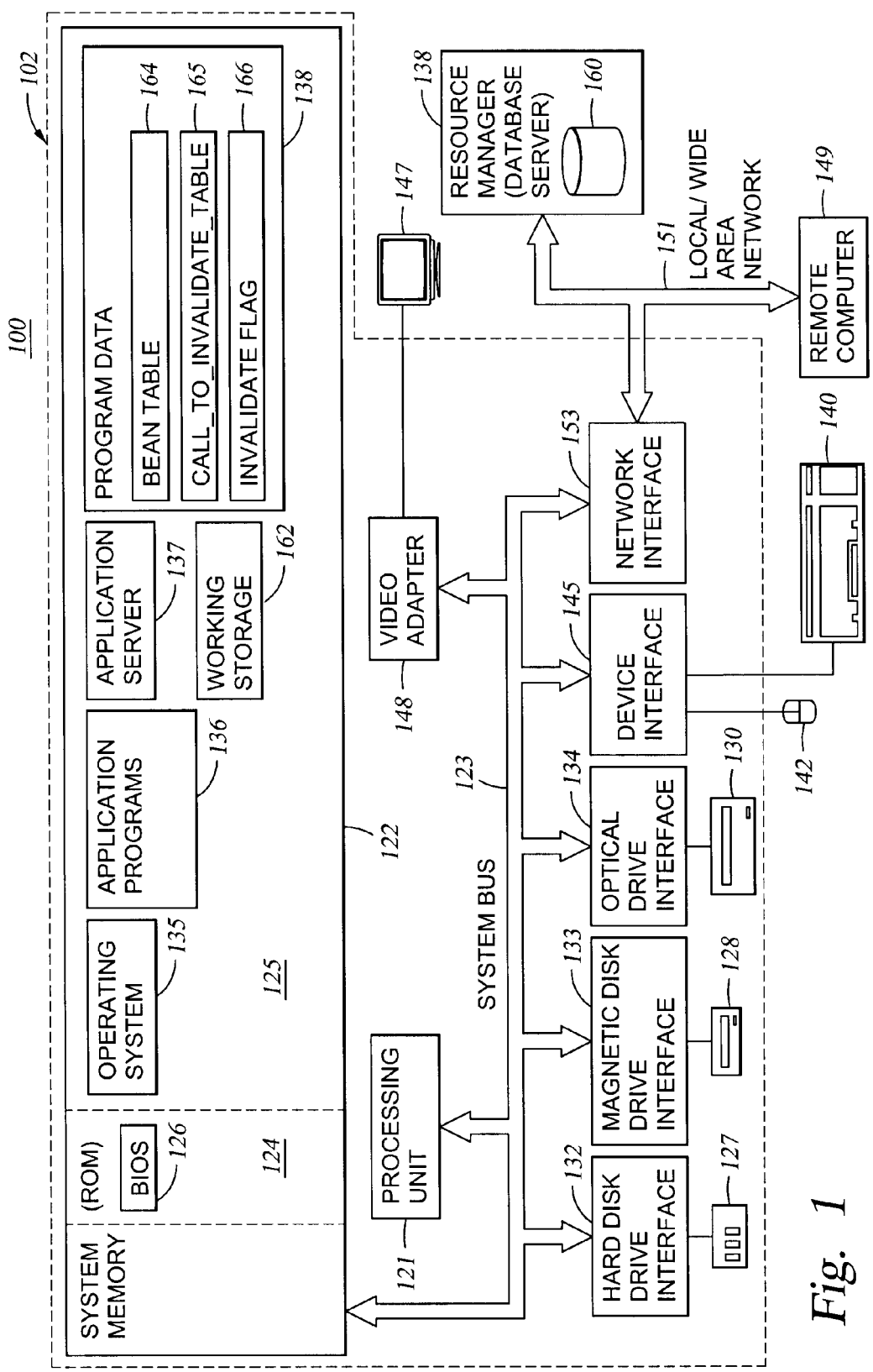
FIG. 1 is an illustrative processing system.

Embodiments of the present invention generally provide methods and systems for maintaining coherency of data. In particular, coherency is maintained between data contained in executable code and a source location of the data (e.g., a table of a database). In a particular embodiment, an enterprise Java Bean (EJB) is hydrated with data retrieved from a database data structure having a trigger defined thereon. The trigger is fired in response to modifying the data structure. In response to firing the trigger, it is determined whether an invalidation criterion for the EJB has been satisfied. If so, the EJB is invalidated.

One embodiment of the invention is implemented as a program product for use with a computer system such as, for example, the processing environment shown in FIG. 1 and described below. The program(s) of the program product defines functions of the embodiments (including the methods described below with reference to FIGS. 4–8) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Some embodiments of the present invention are described in the context of databases. However, embodiments within the scope of the invention are applicable to any data processing system in which it is desirable to ensure the validity of data that is represented in a persistent form as well as in transient form (e.g., stored in cache or other temporary memory location). Further, while the following embodiments are described with reference to EJBs, the present invention is not so limited. Accordingly, any architecture configured with an exclusive property (or any equivalent thereof providing for caching) is within the scope of the invention.

FIG. 1 is a processing environment 100 generally comprising a system 102 communicating with a remote computer 149. Illustratively, the system 102 comprises a processing unit 121, a system memory 122, and a system bus 123 that operatively couples various system components, including the system memory 122, to the processing unit 121. There may be only one or there may be more than one processing unit 121, such that the processor of system 102 comprises a single central-processing unit (CPU), or a plurality of processing units, as in the case of a multiprocessor system.

The system bus 123 may be any of several types of bus structures including a memory bus or memory controller, a peripheral bus, and a local bus using any of a variety of bus architectures. The system memory 122 may also be referred to as simply the "memory", and includes read only memory (ROM) 124 and random access memory (RAM) 125. A basic input/output system (BIOS) 126 stored in ROM 124 contains the basic routines that help to transfer information between elements within the system 102, such as during start-up. A portion of the system memory 122 is set aside as working storage 162. Illustratively, the working storage 162 shown as a part of the random access memory to 25. However, the working storage 162 may be established in any memory space and in particular in high-speed memory devices, such as cache memory. In other embodiments, working storage includes storage on devices such as hard disks.

The system 102 further includes a plurality of storage access devices, which may be configured with working storage. Such devices include a hard disk drive 127, a magnetic disk drive 128, and an optical disk drive 130 (e.g., a CD-ROM or DVD drive). The hard disk drive 127, magnetic disk drive 128, and optical disk drive 130 are connected to the system bus 123 by a hard disk drive interface 132, a magnetic disk drive interface 133, and an optical disk drive interface 134, respectively. The drives and their associated computer-readable media provide nonvolatile storage of computer-readable instructions, data structures, program modules and other data for the system 102. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules and data structures may be stored on the media readable hard disk drive 127, magnetic disk drive 128, optical disk drive 130, ROM 124, or RAM 125. Illustrative programs include an operating system 135, one or more application programs 136 and an application server 137. A plurality of data structures 138 are shown and include a bean table 164, a Call_To_Invalidate table 165 (hereinafter referred to as the "invalidate table 165") and an invalidate flag 166. Illustratively, the invalidate flag 166 is a binary value which may be set to ON or OFF. Embodiments of the bean table 164 and the invalidate table 165 are described below.

A user may enter commands and information into the system 102 through input devices such as a keyboard 140 and a pointing device 142. These and other devices may be connected to the processing unit 121 through an interface 146 that is coupled to the system bus. Illustratively, the interface 146 is a serial port interface, but other interfaces, such as a parallel port or a universal serial bus (USB) are also contemplated. A monitor 147 or other type of display device is also connected to the system bus 123 via an interface, such as a video adapter 148. In addition to the monitor 147, the system 102 may include other peripheral devices such as speakers and printers.

The system 102 may operate in a networked environment using logical connections to one or more remote systems. These logical connections are achieved by a communication device coupled to or part of the system 102. The logical connections depicted in FIG. 1 are represented by a network connection 151 and may include a local-area network (LAN) and a wide-area network (WAN). Such networking environments are commonplace in office networks, enterprise-wide computer networks, intranets and the Internet, which are all types of networks. In one embodiment, the network connection 151 is wireless.

The system 102 is connected to the network 151 through a network interface or adapter 153, which is one type of communications device. When used in a WAN-networking environment, the system 102 may include a modem, or any other type of communications device for establishing communications over the wide area network, such as the Internet. In a networked environment, program modules depicted relative to the personal system 102, or portions thereof, may be stored in the remote memory storage device. It is appreciated that the network connections shown are exemplary and other means of and communications devices for establishing a communications link between the computers may be used.

Illustratively, the network connection 151 communicates the system 102 with a backend resource manager 138 and a remote computer (representing any type of machine, e.g., workstation or personal digital assistant (PDA)). In general, the resource manager 138 may be a relational database, a messaging system, or any type of middleware which provides data management services that can be accessed by an application program 136. In a particular embodiment the backend resource manager 138 is a database server. As such, a database 160 is shown associated with the backend resource manager 138. Although shown separately from the system 102, in another embodiment the backend resource manager 138 is a part of the system 102.

Figure 2:
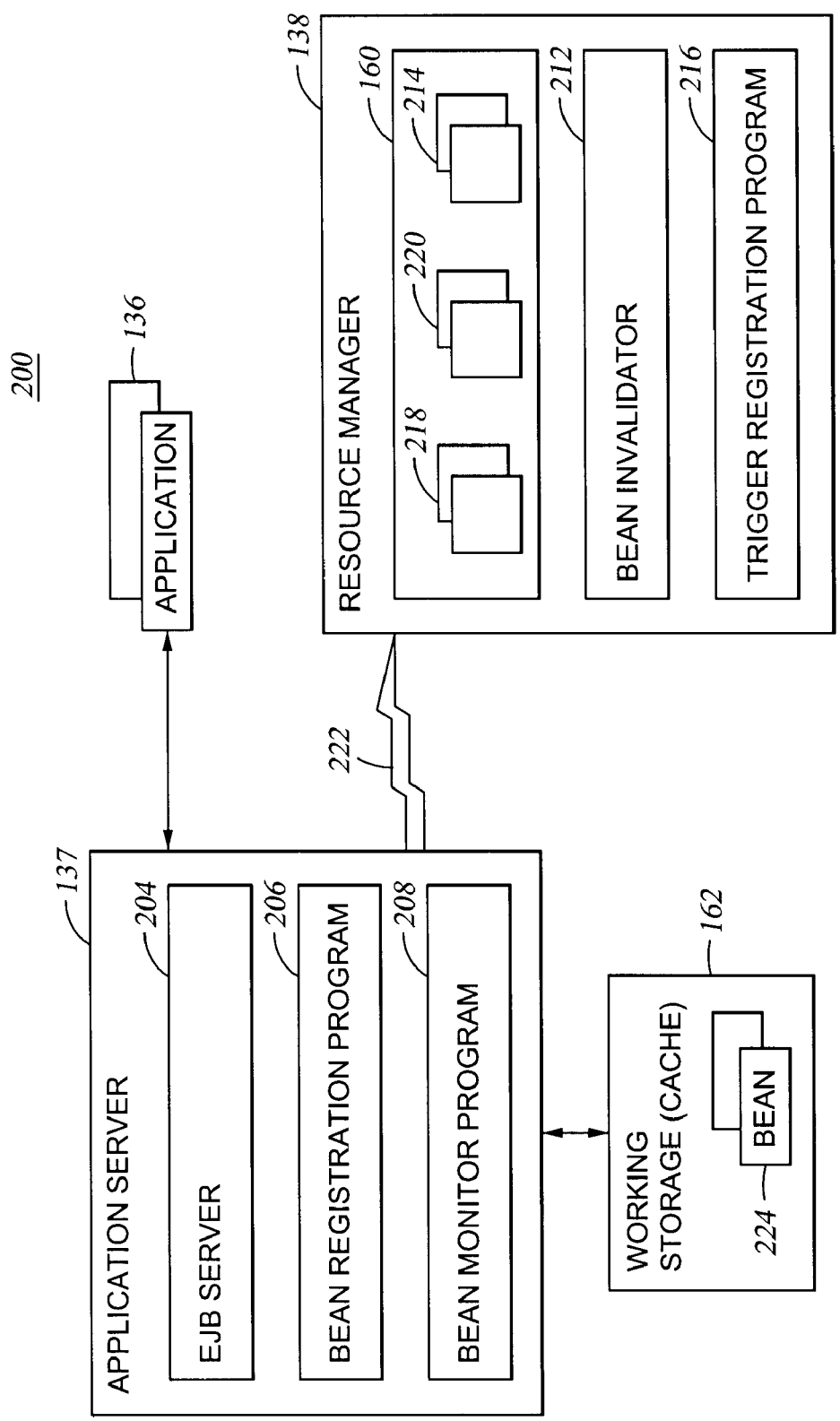
FIG. 2 is a diagram illustrating the relationship between applications, an application server and a resource manager.

FIG. 2 shows a processing environment 200 illustrating embodiments of the application server 137 and the resource manager 138 and their relationships to one another, the applications 136 and working storage 162. Illustratively, the application server 137 comprises an Enterprise JavaBeans (EJB) server 204, a bean registration program 206 and a bean monitor program 208. In one embodiment, the application server 137 is Websphere available from International Business Machines, Inc. In such an embodiment, the application server 137 would also include servlets and a servlet engine to invoke the servlets. A servlet is a relatively small executable code object that can be dynamically plugged in, or added, to the code running on the server. Servlets typically perform some specialized function, which can be invoked by a server (e.g., the EJB server 204) or by another servlet to extend the invoking server's own functionality. The servlet processes the request, and returns the response to the server (or servlet) that invoked it.

The illustrated resource manager 138 comprises the database 160, a bean invalidator program 212, a plurality of triggers 214 and a trigger registration program 216. As previously stated, the resource manager 138 may be any component which provides data management services that can be accessed by an application 136. In a particular embodiment, the resource manager 138 is part of a relational database management system (RDBMS). Databases are computerized information storage and retrieval systems. A relational database management system is a computer database management system that uses relational techniques for storing and retrieving data. Relational databases are computerized information storage and retrieval systems in which data in the form of tables 218 (shown contained in the database 160) are typically stored for use on disk drives or similar mass data stores. A "table" includes a set of rows (formally denominated "tuples" or "records") spanning several columns. Where the resource manager 138 is a RDBMS, it is structured to accept commands to store, retrieve and delete data using high-level query languages such as the Structured Query Language (SQL). The term "query" denominates a set of commands for retrieving data from a stored database 160. In particular, an SQL query can declaratively specify the contents of a view 220. For relational databases, a view is essentially a virtual table having virtual rows and virtual columns of data. Although views are not directly mapped to real data in storage, views can be used for retrieval as if the data they represent is actually stored. A view can be used to present to a user a single logical view of information that is actually spread across one or more tables.

In operation, the applications 136 make requests for data to the application server 137. When data from the resource manager 138 is needed, the Application Server 137 uses a connection 222 over which messages are sent and received. While FIG. 2 shows a single resource manager 138 having a single connection 222 to application server 137, there may be many such connections at any given time. Typically, an application server 137 will have many concurrent threads running at one time, where a thread is a single execution of a re-entrant program. Each thread may have its own connection to the resource manager 138. In this case, the multiple connections originate from a single application server. However, multiple application servers may also connect to one particular resource manager, where each application server may use threads and therefore have multiple connections. Additionally, one application server 137 may have connections to multiple resource managers (including multiple connections to each of the multiple resource managers) at a given time. For example, to fulfill a single client request, an application server 137 may need to access a relational database and a messaging service, in which case (at least) two different connections are required.

The working storage 162 is shown in communication with the application server 137 and provides memory space for storing/caching beans 224. In particular, the beans 224 are exclusive beans hydrated with data from the tables 218.

In some cases, triggers 214 are defined on one or more of the tables 218. Triggers 214 are procedures that may be defined, for example, by users of the resource manager 138. The resource manager 138 invokes triggers 218 when particular events (associated with the triggers) occur. Specifically, an SQL trigger program is written to take some action due to an insert, update, or delete operation against an SQL table 218 in the database 160. For example, in the case of an insert operation, a trigger can be defined such that it is invoked each time a row is inserted into a particular SQL table. A trigger can instruct a system to take any number of actions when a specified change is attempted. Accordingly, triggers help maintain the integrity of the database 160.

Figure 3:
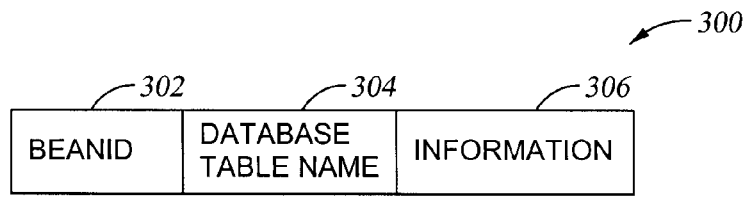
FIG. 3 is a data structure illustrating one embodiment of a bean table.
Figure 4:
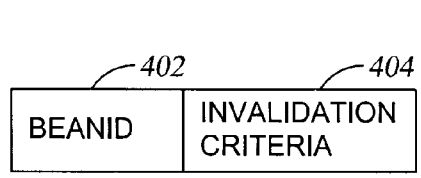
FIG. 4 is a data structure illustrating one embodiment of an invalidation table.

Embodiments of the bean table 164 and the invalidate table 165 are shown in FIG. 3 and FIG. 4, respectively. In each case the tables may be organized as a plurality of rows and columns. The columns designate a particular category of information while each row comprises a record in the table. For simplicity, the tables shown in FIG. 3 and FIG. 4 show a single row of the respective table.

Referring first FIG. 3 an embodiment of a row 300 in the bean table 164 is shown. Illustratively, the row 300 comprises a bean ID entry 302, a database table name entry 304, and an information entry 306. The bean ID entry 302 contains a unique representation of an enterprise JavaBean. Each enterprise JavaBean is known to the EJB server 204 and the resource manager 138 through this identifier. The database table name entry 304 indicates the associated table(s) 218 that the bean accesses. The information entry 306 is representative of other information which may be contained in the bean table 164.

FIG. 4 shows an embodiment of a row 400 in the invalidate table 165. In general, the row 400 contains information used by the resource manager 138 to invalidate existing beans. In the illustrated embodiment the row 400 comprises a bean ID entry 402 and an invalidation criteria entry 404. The bean ID entry 402 contains bean identifying information provided from the bean ID entry 302. In this way, the identification information contained in entry 302 may be used to access the appropriate row 400 according to the identification information contained in the entry 402. The invalidation criteria entry 404 contains the criteria by which a bean is invalidated. For example, the invalidation criteria may dictate that a bean will be invalidated if certain columns of an underlying database table 218 change. In this case, the invalidation criteria would include a reference to the particular column(s) of interest. In various embodiments, the column of interest may include a particular column, one of a plurality of columns or a combination of columns. Additionally or alternatively, the degree to which a column is affected may be used to invalidate a bean. For example, a bean may be invalidated if a numerical value doubles, a numeric value turns negative, a character value changes its first letter, etc. In any case, the invalidation criteria are provided by invalidation property values defined for a particular bean. These invalidation property values may be defined, for example, by a programmer at the time of creation of the bean or even subsequent thereto. The invalidation criteria entry 404 may then be populated according to the invalidation property values during registration of the bean, as will be described below. It should be noted, however, that in some cases a bean may be defined without invalidation properties and still be invalidated in the event of predefined circumstances. For example, it may be desirable to invalidate a bean if any portion of the underlying data structure changes.

Figure 5:
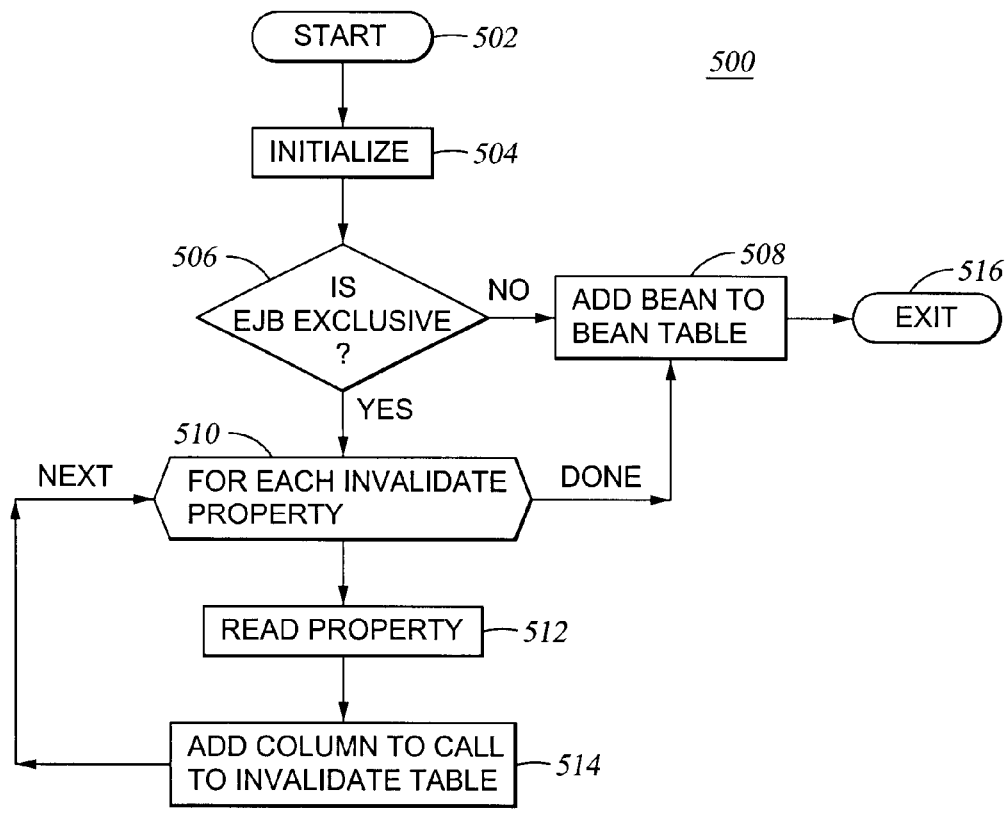
FIG. 5 is a bean registration method.

FIG. 5 shows a method 500 for registering an enterprise JavaBean. Typically, registration occurs after a bean has been created. In one embodiment, the method 500 may be understood as illustrating the execution of the bean registration program 206. The method 500 enters at step 502 and proceeds to step 504 for initialization. Initialization may include, for example, setting up access to the resource manager 138 for retrieval of a bean ID and retrieving bean information from the bean being deployed. After initialization, the method 500 proceeds to step 506 and queries whether the enterprise JavaBean is "exclusive". That is, a determination is made as to whether the bean being registered has its exclusive property enabled. If not, the method 500 proceeds to step 508 where a row 300 is inserted into the bean table 164 for the bean being registered. The bean ID used to populate the bean ID entry 302 may be generated by any number of methods, including those known in the art. For example, the bean ID may be generated using database sequence numbers or by using identity columns. The method 500 that exits at step 516.

Returning to step 506, if the exclusive property of the bean is not enabled, the method 500 enters a loop at step 510. The loop is iterated for each invalidation property associated with the bean being registered. For each invalidation property, the property value is read at step 512 and then added to the invalidation criteria entry 404 for a row 400 of the invalidation table 165. Once each invalidation property has been processed, the method 500 proceeds to step 508 where the bean is added to the bean table 164 before exiting at step 516.

Figure 6:
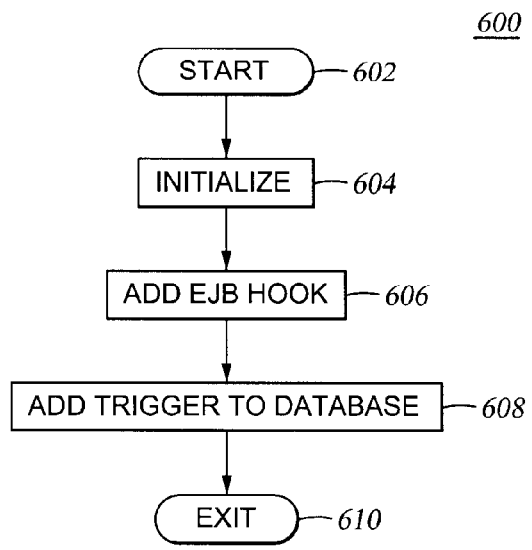
FIG. 6 is a trigger registration method.

FIG. 6 shows a method 600 for trigger registration. Trigger registration may be accomplished by invoking the trigger registration program 216 upon creation of a trigger (e.g., via the CREATE TRIGGER statement). The method 600 is entered at step 602 and proceeds to step 604 for initialization. Initialization may include, for example, validating trigger syntax, naming the trigger to the resource manager 138 and other functions that are known in the art. At step 606, an EJB hook is added to the trigger. In one embodiment, the EJB hook is an exit program that is run when the trigger is invoked. The EJB hook may also take on other forms such as inlined code or an external call. At step 608, the trigger is added to the database 160 before the method 600 exits at step 610.

In one embodiment, an EJB hook is added to each trigger at registration time. However, is contemplated that the hooks need only be added when an exclusive bean, which affects an existing trigger, is registered. It is also contemplated that hooks may be removed when beans are removed from the working storage 162. These and other approaches may be implemented for performance considerations, as trigger execution may be slowed down by adding unnecessary hooks.

In some embodiments it may be desirable to create a trigger dedicated solely to implementing the functions of the present invention (e.g., via the EJB hook). In other embodiments, a trigger may already be defined for a particular table of interest. In this case, the existing trigger may be configured with the EJB hook, thereby "piggy-backing" off of the existing trigger and avoiding the need for a separate trigger.

Figure 7:
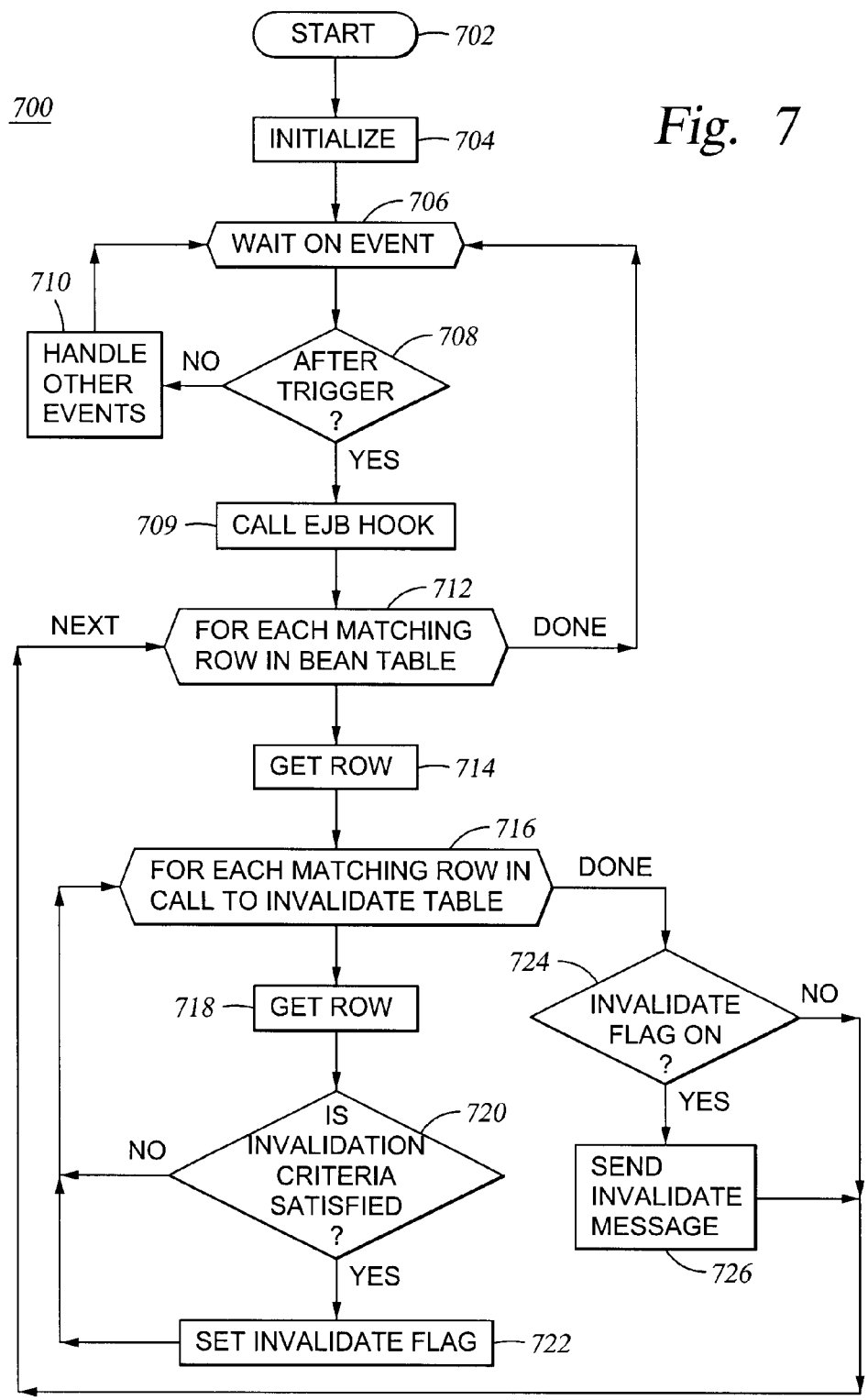
FIG. 7 is a bean monitor method.

FIG. 7 shows a method 700 used by the resource manager 138 to determine whether an EJB or set of EJB's should be invalidated. In one embodiment, the method 700 may be understood as illustrating the execution of the bean monitor program 208. The method 700 enters at step 702 and proceeds to step 704 for initialization. Initialization includes, for example, setting the value of the invalidate flag 166 to OFF. At step 706 the method 700 waits on an event. Once the event is received, the method 700 queries, at step 708, whether the event is an AFTER DELETE trigger or an UPDATE trigger. As is well known, an AFTER trigger takes some action subsequent to the writing of the changes produced by the execution of the operation (e.g. insert or update) to the database (i.e., to the permanent structures). Conversely, a BEFORE trigger takes action prior to the completion of the operation. If the trigger is not an AFTER trigger, the method 700 proceeds to step 710 where the event is handled according to predefined rules. Events handled at step 710 include execution of SQL statements, BEFORE trigger events, and the like. Alternatively, if step 708 is answered affirmatively, the method 700 calls an EJB hook defined for the trigger, at step 709.

As a result of calling the EJB hook, the method 700 enters a loop at step 712 for each matching row in the bean table 164. A matching row is any row 300 having a database table name entry 304 containing the table name of the table the trigger is being fired upon. Accordingly, a matching record, if any, is retrieved at step 714. The method 700 and proceeds to step 716 where all matching records in the invalidation table 165 are read. A matching record includes each record 400 having a bean ID in the bean ID entry 402 that matches the bean ID contained in the entry 302 of the row 300 retrieved at step 714. A matching record, if any, is retrieved from the invalidation table 165 at step 718.

At step 720, the method 700 queries whether the invalidation criteria contained in entry 404 of the row 400 is satisfied. If not, the method 700 returns to step 716 to locate another matching row in the invalidation table 165. If, on the other hand, step 720 is answered affirmatively, the invalidate flag 166 is set to ON at step 722. The method 700 then returns to step 716.

Once each of the matching row is in the invalidation table 165 have been processed, the method 700 proceeds to step 724 and queries whether the invalidate flag 166 is ON. If not, the method 700 returns to step 712 to process any other matching rows in the bean table 164. If the invalidate flag 166 is ON, then an invalidation message is sent to the EJB server 204 at step 726. The method 700 then returns to step 712. When each of the matching rows has been processed at step 712, the method 700 returns to step 706 to wait on an event.

Figure 8:
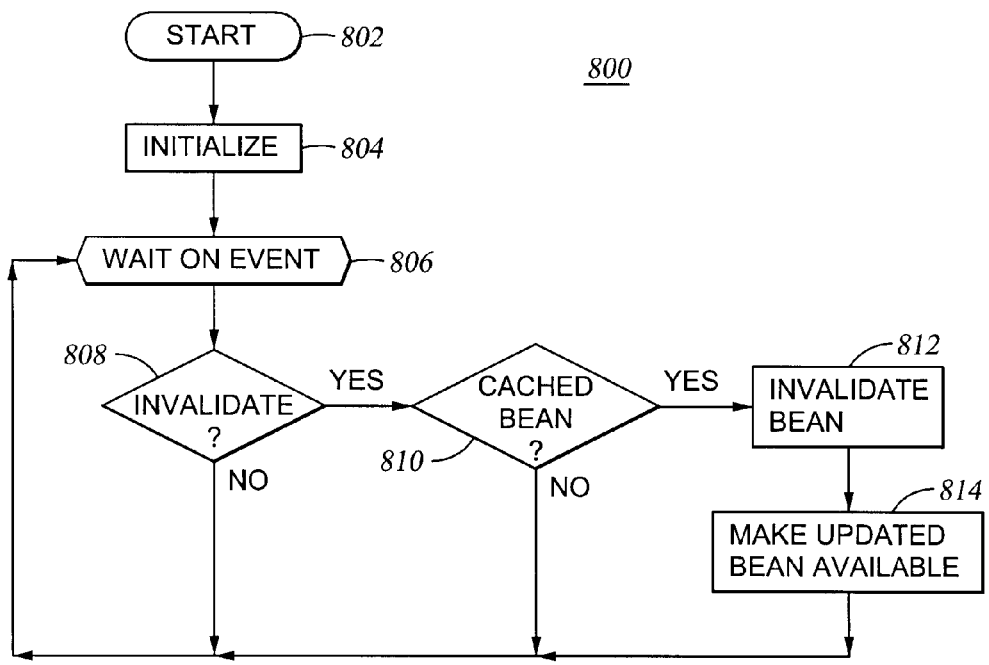
FIG. 8 is a bean invalidator method.

FIG. 8 shows a method 800 of invalidating a bean. In one embodiment, the method 800 may be understood as illustrating the execution of the bean invalidator program 212. The method 800 is entered at step 802 and proceeds to step 804 for initialization. Initialization includes, for example, ensuring connectivity between the resource manager 138 and the application server 137. Following initialization, the method 800 proceeds to step 806 to wait on an event. Upon receiving an event, the method 800 determines whether the event is to invalidate a bean at step 808. If not, the method returns to step 806. It however, the event is to invalidate a bean, the method queries, at step 810, whether a cached bean 224 exists for the database raw that was changed. This may be done by methods known in the art including using a primary key. Ifs cached bean 224 exists, the method 800 proceeds to step 812; otherwise, the method returns to step 806 to wait on another event.

At step 812 the appropriate cached bean 224 is invalidated. Invalidation at step 812 includes any steps sufficient to make a cached bean unavailable to the EJB server 204, including removing the cached bean 224 from working storage 162 or placing an exclusive lock on the bean. In this manner, the method 800 ensures that the applications 136 do not utilize cached data (i.e., data in the working storage 162) that is inconsistent with the underlying source data contained in the database 160.

At step 814 a cached bean 224 updated with the most recent changes made to the underlying table 218 is made available in the working storage 162. In the event that the cached bean 224 was locked at step 812, step 814 may include rehydrating and validating the bean. In the event that the cached bean 224 was removed from working storage 162 at step 812, step 814 may include storing another cached bean 224 to working storage 162 and hydrating the bean with the appropriate updated row from a table 218. The method 800 then returns to step 806.

While the foregoing is directed to embodiments of the present invention, other and further embodiments of the invention may be devised without departing from the basic scope thereof, and the scope thereof is determined by the claims that follow.

What is claimed is:

1. A method for ensuring coherency of data in a computer system, comprising:
   retrieving data from a table having a trigger defined thereon;
   placing the data within an Enterprise Java Bean (EJB) configured to utilize the data and configured with a property indicating that, during execution, the data will be accessed from the EJB instead of the table;
   modifying the table;
   in response to modifying the table, firing the trigger; and
   in response to firing the trigger, invalidating the EJB.

2. The method of claim, further comprising determining whether the data is located in working storage in response to firing the trigger defined on the table.

3. The method of claim 1, wherein the trigger is an AFTER trigger.

4. The method of claim 1, wherein invalidating the EJB is done only after determining that the table was modified in a manner defined by a stored invalidation criterion.

5. The method of claim 1, wherein invalidating the EJB is done only after determining that an invalidation criterion is satisfied.

6. The method of claim 5, wherein determining that the invalidation criterion is satisfied comprises accessing at least one data structure comprising an executable code entry containing a code identifier and an invalidation criterion entry containing the invalidation criterion.

7. The method of claim 5, wherein that the invalidation criterion is satisfied is dependent on a manner in which the table was modified.

8. The method of claim 5, wherein the invalidation criterion comprises affecting a column of the table.

9. The method of claim 1, wherein placing the data with the EJB comprises placing the data in working storage.

10. The method of claim 9, wherein placing the data in working storage comprises placing the data in memory.

11. The method of claim 9, wherein placing the data in working storage comprises paging the data to storage.

12. A method for ensuring coherency of data in a computer system, comprising:
    hydrating an enterprise Java Bean (EJB) with data retrieved from a database data structure having a trigger defined thereon;
    firing the trigger in response to modifying the database data structure;
    in response to firing the trigger, determining whether an invalidation criterion for the EJB has been satisfied; and
    if so, invalidating the EJB.

13. The method of claim 12, wherein determining whether the invalidation criterion has been satisfied comprises determining whether at least one column of the table has been modified.

14. The method of claim 12, wherein invalidating the EJB comprises making the EJB unavailable to en EJB server.

15. The method of claim 12, wherein the EJB has an exclusive property enabled.

16. The method of claim 12, wherein the EJB is contained in working storage.

17. The method of claim 12, wherein the trigger is an AFTER trigger.

18. The method of claim 12, wherein determining whether the invalidation criterion is satisfied comprises accessing at least one data structure comprising a table identifier for the table, an EJB identifier for the EJB and the invalidation criterion.

19. A computer-readable medium containing a program which, when executed by a processor, performs steps comprising:

processing a signal indicating that a trigger defined on a database data structure has fired in response to modifying the database data structure;

determining whether an invalidation criterion for an enterprise Java Bean (EJB) contained in working storage with data retrieved from the database data structure has been satisfied; wherein the invalidation criterion is satisfied according to a manner in which the data structure is modified; and if the invalidation criterion is satisfied, invalidating the EJB.

20. The computer-readable medium of claim 19, wherein determining whether the invalidation criterion has been satisfied comprises determining whether at least one column of the table has been modified.

21. The computer-readable medium of claim 19, wherein invalidating the EJB comprises making the EJB unavailable to an EJB server.

22. The computer-readable medium of claim 19, wherein the EJB has an exclusive property enabled.

23. The computer-readable medium of claim 19, wherein the trigger is an AFTER trigger.

24. The computer-readable medium of claim 19, wherein determining whether the invalidation criterion is satisfied comprises accessing at least one data structure comprising a table identifier for the table, an EJB identifier for the EJB and the invalidation criterion.

25. A computer system for ensuring coherency of data, comprising:

a database containing at least one table having a trigger defined thereon;

at least one of a memory area and a storage area configured to store at least one EJB hydrated with data from the at least one table and configured with an exclusive property and an invalidation property that causes the EJB to be invalidated in response to the trigger firing when an invalidation criterion is satisfied; and an enterprise Java Bean (EJB) server configured to communicate with the database.

26. The computer system of claim 25, wherein the invalidation criterion specifies a modification to at least one column of the at least one table.

27. The computer system of claim 25, wherein the at least one of the memory area and the storage area is cache memory.

28. The computer system of claim 25, wherein the EJB server is part of WebSphere.

29. A data structure contained in a memory, comprising:

a table identifier for a table contained in a database and having a trigger defined thereon, wherein the trigger is configured to fire upon modifying the table;

a code identifier for an enterprise Java Bean (EJB) contained in a cache memory and hydrated with data from the table; and an invalidation criterion which, when satisfied as result of modifying the table, causes the EJB to be invalidated.

30. The data structure of claim 29, wherein the trigger is an AFTER trigger.

31. The data structure of claim 29, wherein the invalidation criterion specifies at least a modification to at least one column of the table.

32. The data structure of claim 29, wherein invalidating the EJB prevents access of the EJB by an enterprise Java Bean server.

* * * * *